United States Patent
He et al.

(10) Patent No.: US 10,122,679 B2
(45) Date of Patent: Nov. 6, 2018

(54) METHOD, RELAY AGENT, AND SYSTEM FOR ACQUIRING INTERNET PROTOCOL ADDRESS IN NETWORK

(71) Applicant: Huawei Technologies Co., Ltd., Shenzhen, Guangdong (CN)

(72) Inventors: Qingtao He, Xi'an (CN); Yong Li, Xi'an (CN); Bo Ke, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 178 days.

(21) Appl. No.: 14/736,013

(22) Filed: Jun. 10, 2015

(65) Prior Publication Data

US 2015/0281172 A1    Oct. 1, 2015

Related U.S. Application Data

(63) Continuation of application No. PCT/CN2013/089968, filed on Dec. 19, 2013.

(30) Foreign Application Priority Data

Dec. 19, 2012    (CN) .......................... 2012 1 0553582

(51) Int. Cl.
  *H04L 29/12* (2006.01)
  *H04L 12/24* (2006.01)
(52) U.S. Cl.
  CPC .......... *H04L 61/2015* (2013.01); *H04L 41/12* (2013.01)
(58) Field of Classification Search
  CPC ............................ H04L 41/12; H04L 61/2015
  See application file for complete search history.

(56) References Cited

U.S. PATENT DOCUMENTS 6,587,468 B1    7/2003  Dos Santos et al.
7,337,224 B1 *  2/2008  Van Horne, III ..........................
                                    H04L 29/12283
                                                        709/223
(Continued)

FOREIGN PATENT DOCUMENTS

CN    1949784 A      4/2007
CN    101534329 A    9/2009
CN    102404418 A    4/2012
(Continued)

OTHER PUBLICATIONS

CN1949784A_EPO_Translation.*
(Continued)

*Primary Examiner* — Abdulkader M Alriyashi

(57) ABSTRACT

Embodiments of the present invention disclose a method, relay agent and system for acquiring an IP address in a network. According to the method, the relay agent configures multiple gateway IP addresses corresponding to a type of a client, adds the multiple gateway IP addresses to a DHCP Discover packet of the client, and sends the DHCP Discover packet to a DHCP server, so that the DHCP server allocates an IP address to the client, and sends a DHCP Offer packet to the client after determining that one gateway IP address in the multiple gateway IP addresses belongs to a same network segment as the allocated IP address, so that the DHCP server allocates the IP address to the client, thereby implementing that multiple IPs in different IP address segments are allocated to a same DHCP client type.

9 Claims, 6 Drawing Sheets

(56) References Cited

U.S. PATENT DOCUMENTS

2005/0074015 A1* 4/2005 Chari ............... H04L 12/2856
370/400
2009/0279454 A1 11/2009 Wacker et al.

FOREIGN PATENT DOCUMENTS

EP    2 037 659 A2    3/2009
WO   WO 2012/163007 A1   12/2012

OTHER PUBLICATIONS

Kenji Hori et al., "Automatic Configuration Method for IP Routers in Dynamically Changing Network", Electronics and Communications in Japan, Part 1, vol. 89, No. 5, May 1, 2006, p. 15-27.
"Understanding relay agents", Dynamic Host Configuration Protocol, Jan. 21, 2005, 2 pages.

* cited by examiner understand# METHOD, RELAY AGENT, AND SYSTEM FOR ACQUIRING INTERNET PROTOCOL ADDRESS IN NETWORK

CROSS REFERENCE TO RELATED APPLICATIONS

This application is a continuation of International Application No.PCT/CN2013/089968, filed on Dec. 19, 2013, which claims priority to Chinese Patent Application No.201210553582.7, filed on Dec. 19, 2012, both of which are hereby incorporated by reference in their entireties.

TECHNICAL FIELD

The present invention relates to the communications field, and in particular, to a method, a relay agent, and a system for acquiring an IP address in a network.

BACKGROUND

The Dynamic Host Configuration Protocol (Dynamic Host Configuration Protocol, DHCP) is a dynamic address allocation solution based on the TCP/IP protocol. Compared with manual configuration of an IP address, the DHCP has advantages, for example, TCP/IP parameters (including an IP address, a subnet mask, a default gateway, a DNS, and the like) can be automatically configured, and an allocated IP address has a lease time and can be reclaimed for reuse after the lease time expires. In this way, all configuration information of the TCP/IP protocol may be stored on a DHCP server in a centralized manner. Centralized storage and management can prevent an IP address conflict, and can also free an administrator from burdensome manual configuration work. The advantages of the DHCP are becoming more prominent when a network scale at present is becoming larger.

Because the DHCP protocol needs to use a broadcast request to configure an IP address, this leads to a limitation that a DHCP client and the DHCP server need to be in a same physical network segment, where each physical network segment needs one DHCP server. If the DHCP client and the DHCP server are not in the same physical network segment, the DHCP client needs to use a DHCP relay agent (DHCP Relay Agent, DHCP relay agent) to acquire an IP address from the DHCP server that is in a different physical network segment. A network device with a DHCP relay function may receive a DHCP request packet and forward the DHCP request packet to a DHCP server in another physical network segment; in this case, the DHCP server can perform corresponding configuration for a DHCP client in a different physical network segment. Therefore, by using a DHCP relay agent, a limitation that each physical network segment needs one DHCP server may be lifted.

Currently, implementation of a DHCP relay agent is as follows: a DHCP client type is differentiated according to an OPTION60 or a MAC address in a DHCP request packet, and one DHCP gateway IP address is allocated to one DHCP client type. Therefore, an existing DHCP relay agent cannot be implemented in a case in which different network segments need to be allocated to a same client type, for example, two types of DHCP clients have a same OPTION60, but a DHCP server needs to allocate, according to their different area locations or different types of services provided by them, IP addresses in different network segments to the two types of DHCP clients.

SUMMARY

Embodiments of the present invention are intended to provide a method, relay agent, and system for acquiring an IP address in a network, which can implement that multiple IPs in different IP address segments are allocated to a same DHCP client type.

According to a first aspect, a method for acquiring an Internet Protocol IP address in a network is provided, where the network includes a client, a relay agent, and a Dynamic Host Configuration Protocol DHCP server, the client is connected to the DHCP server via the relay agent, multiple gateway gateway IP addresses corresponding to a type of the client are configured in the relay agent, and the method includes:

adding, by the relay agent, the multiple gateway IP addresses to a DHCP Discover packet of the client, and sending the DHCP Discover packet to the DHCP server, so that the DHCP server allocates an IP address to the client, and sends a DHCP Offer packet to the client after determining that one gateway IP address in the multiple gateway IP addresses belongs to a same network segment as the allocated IP address;

receiving, by the relay agent, a DHCP Request packet from the client, and acquiring the IP address of the client from the DHCP Request packet; and adding, by the relay agent to the DHCP Request packet, the gateway IP address that is in the multiple gateway IP addresses and belongs to the same network segment as the IP address of the client, and sending the DHCP Request packet with the gateway IP address to the DHCP server, so that the DHCP server allocates the IP address to the client.

With reference to the first aspect, in a first possible implementation manner of the first aspect, before the adding, by the relay agent, the multiple gateway IP addresses to a DHCP Discover packet of the client, and sending the DHCP Discover packet to the DHCP server, the method further includes:

acquiring the type of the client, and acquiring the multiple corresponding gateway IP addresses according to the type of the client.

With reference to the first aspect, in a second possible implementation manner of the first aspect, the adding, by the relay agent, the multiple gateway IP addresses to a DHCP Discover packet of the client, and sending the DHCP Discover packet to the DHCP server specifically includes:

receiving the DHCP Discover packet from the client, replicating the DHCP Discover packet to obtain multiple DHCP Discover packets, adding one gateway IP address in the multiple gateway IP addresses to each DHCP Discover packet, and sending the multiple DHCP Discover packets carrying different gateway IP addresses to the DHCP server.

With reference to the first aspect, in a third possible implementation manner of the first aspect, the adding, by the relay agent, the multiple gateway IP addresses to a DHCP Discover packet of the client, and sending the DHCP Discover packet to the DHCP server specifically includes:

receiving multiple DHCP Discover packets of the client, sequentially adding the multiple gateway IP addresses to the multiple DHCP Discover packets, and sending the multiple DHCP Discover packets to the DHCP server, where each DHCP Discover packet carries one different gateway IP address.

With reference to the first aspect, or the first possible implementation manner of the first aspect, or the second possible implementation manner of the first aspect, or the third possible implementation manner of the first aspect, in a fourth possible implementation manner of the first aspect, the acquiring the IP address of the client from the DHCP Request packet specifically includes:

acquiring the IP address of the client from an Option 50 field or a ciaddr field of the DHCP Request packet.

According to a second aspect, a relay agent includes:

a user-side port, configured to connect to a client, and configured to receive a Dynamic Host Configuration Protocol DHCP Discover packet of the client;

a memory, configured to store multiple gateway IP addresses corresponding to a type of the client;

a network-side port, configured to connect to a DHCP server;

a first processor, configured to add the multiple gateway IP addresses to the DHCP Discover packet of the client, and send the DHCP Discover packet to the DHCP server by using the network-side port, so that the DHCP server allocates an IP address to the client, and sends a DHCP Offer packet to the client after determining that one gateway IP address in the multiple gateway IP addresses belongs to a same network segment as the allocated IP address; and a second processor, configured to: after a DHCP Request packet from the client is received by the user-side port, acquire the IP address of the client from the DHCP Request packet, select, from the multiple gateway IP addresses, one gateway IP address that belongs to the same network segment as the IP address of the client, add the selected gateway IP address to the DHCP Request packet, and send the DHCP Request packet to the DHCP server, so that the DHCP server allocates the IP address to the client.

With reference to the second aspect, in a first possible implementation manner of the second aspect, the first processor specifically includes:

a replicating module, configured to replicate the DHCP Discover packet to obtain multiple DHCP Discover packets;

an adding module, configured to add one gateway IP address in the multiple gateway IP addresses to each DHCP Discover packet; and a sending module, configured to send the multiple DHCP Discover packets carrying different gateway IP addresses to the DHCP server by using the network-side port.

With reference to the second aspect, in a second possible implementation manner of the second aspect, the first processor specifically includes:

an adding module, configured to add the multiple gateway IP addresses to multiple DHCP Discover packets received by the user-side port, and add one gateway IP address to each DHCP discover packet; and a sending module, configured to send the multiple DHCP Discover packets added the gateway IP addresses to the DHCP server.

With reference to the second aspect, or the first possible implementation manner of the second aspect, or the second possible implementation manner of the second aspect, in a third possible implementation manner of the second aspect, the second processor specifically acquires the IP address of the client from an Option 50 field or a ciaddr field of the DHCP Request packet.

With reference to the third possible implementation manner of the second aspect, in a fourth possible implementation manner of the second aspect, the relay agent is a digital subscriber line access multiplexer DSLAM, an optical line terminal OLT, or a multiservice access node MSAN.

According to a third aspect, a system for acquiring an Internet Protocol IP includes: a client, a relay agent, and a Dynamic Host Configuration Protocol DHCP server, where the client is connected to the DHCP server via the relay agent;

the relay agent, configured with multiple gateway IP addresses corresponding to a type of the client, adds the multiple gateway IP addresses to a DHCP Discover packet of the client, and sends the DHCP Discover packet to the DHCP server; receives a DHCP Request packet from the client, acquires an IP address of the client from the DHCP Request packet, selects, from the multiple gateway IP addresses, one gateway IP address that belongs to a same network segment as the IP address of the client, adds the selected gateway IP address to the DHCP Request packet, and sends the DHCP Request packet to the DHCP server, so that the DHCP server allocates the IP address to the client; and the DHCP server is configured to: after receiving the DHCP Discover packet, allocate the IP address to the client, and send a DHCP Offer packet to the client after determining that one gateway IP address in the multiple gateway IP addresses belongs to the same network segment as the allocated IP address.

With reference to the third aspect, in a first possible implementation manner of the third aspect, that the relay agent adds the multiple gateway IP addresses to a DHCP Discover packet of the client, and sends the DHCP Discover packet to the DHCP server specifically includes:

receiving the DHCP Discover packet from the client, replicating the DROP Discover packet to obtain multiple DHCP Discover packets, adding one gateway IP address in the multiple gateway IP addresses to each DHCP Discover packet, and sending the multiple DHCP Discover packets carrying different gateway IP addresses to the DHCP server.

With reference to the third aspect, in a second possible implementation manner of the third aspect, that the relay agent adds the multiple gateway IP addresses to a DHCP Discover packet of the client, and sends the DHCP Discover packet to the DHCP server specifically includes:

receiving multiple DHCP Discover packets of the client, sequentially adding the multiple gateway IP addresses to the multiple DHCP Discover packets, and sending the multiple DHCP Discover packets to the DHCP server, where each DHCP Discover packet carries one different gateway IP address.

With reference to the third aspect, or the first possible implementation manner of the third aspect, or the second possible implementation manner of the third aspect, in a third possible implementation manner of the third aspect, the relay agent is further configured to: after receiving the DHCP Discover packet of the client, acquire the type of the client, and acquire the multiple corresponding gateway IP addresses according to the type of the client.

Compared with the prior art, embodiments of the present invention provide a method for acquiring an IP address in a network, and according to the method, a relay agent configures multiple gateway IP addresses corresponding to a type of a client; the relay agent adds the multiple gateway IP addresses to a DHCP Discover packet of the client, and sends the DHCP Discover packet to a DHCP server, so that the DHCP server allocates an IP address to the client, and sends a DHCP Offer packet to the client after determining that one gateway IP address in the multiple gateway IP addresses belongs to a same network segment as the allocated IP address; the relay agent adds, to a DHCP Request packet, the gateway IP address that is in the multiple gateway IP addresses and belongs to the same network segment as the IP address of the client, and sends the DHCP Request packet with the gateway IP address to the DHCP server, so that the DHCP server allocates the IP address to the client. In this way, it is implemented that multiple IPs in different IP address segments are allocated to a same DHCP client type.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

To make the objectives, technical solutions, and advantages of the present invention clearer and more comprehensible, the following further describes the present invention in detail with reference to the accompanying drawings and embodiments. It should be understood that the specific embodiments described herein are merely used to explain the present invention but are not intended to limit the present invention.

The foregoing descriptions are merely exemplary embodiments of the present invention, but are not intended to limit the present invention. Any modification, equivalent replacement, or improvement made without departing from the spirit and principle of the present invention should fall within the protection scope of the present invention.

Embodiment 1

Figure 1:
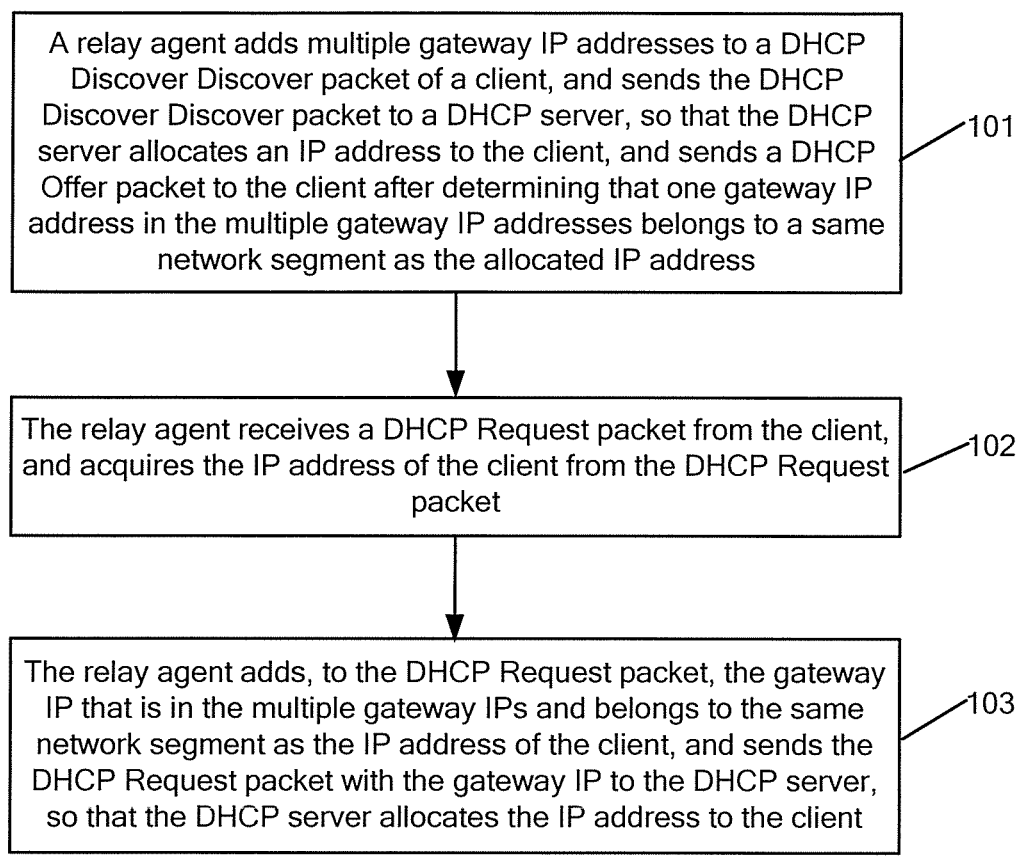
FIG. 1 is a flowchart of a method for acquiring an IP address in a network according to Embodiment 1 of the present invention.

Referring to FIG. 1, FIG. 1 is a flowchart of a method for acquiring an IP address in a network according to Embodiment 1 of the present invention. As shown in FIG. 1, the method includes the following steps:

Step 101. A relay agent adds multiple gateway IP addresses to a DHCP Discover packet of a client, and sends the DHCP Discover packet to a DHCP server, so that the DHCP server allocates an IP address to the client, and sends a DHCP Offer packet to the client after determining that one gateway IP address in the multiple gateway IP addresses belongs to a same network segment as the allocated IP address.

Realizably, before that a relay agent adds multiple gateway IP addresses to a DHCP Discover packet of a client, and sends the DHCP Discover packet to a DHCP server, the method further includes:

acquiring a type of the client, and acquiring multiple corresponding gateway IP addresses according to the type of the client.

In this step, the DHCP relay agent learns a gateway IP address automatically, that is, the DHCP relay agent configures multiple gateway IP addresses for a same DHCP client type.

Realizably, that a relay agent adds multiple gateway IP addresses to a DHCP Discover packet of a client, and sends the DHCP Discover packet to a DHCP server specifically includes:

receiving the DHCP Discover packet from the client, replicating the DHCP Discover packet to obtain multiple DHCP Discover packets, adding one gateway IP address in the multiple gateway IP addresses to each DHCP Discover packet, and sending the multiple DHCP Discover packets carrying different gateway IP addresses to the DHCP server.

In this step, the DHCP Discover packet is the first packet when the DHCP client starts a DHCP procedure, and the DHCP client sends the DHCP Discover packet to the DHCP server, so as to request the DHCP server to configure a correct IP address for the DHCP client.

Realizably, that a relay agent adds multiple gateway IP addresses to a DHCP Discover packet of a client, and sends the DHCP Discover packet to a DHCP server specifically includes:

receiving multiple DHCP Discover packets of the client, sequentially adding the multiple gateway IP addresses to the multiple DHCP Discover packets, and sending the multiple DHCP Discover packets to the DHCP server, where each DHCP Discover packet carries one different gateway IP address.

Step 102. The relay agent receives a DHCP Request packet from the client, and acquires the IP address of the client from the DHCP Request packet.

Realizably, the acquiring the IP address of the client from the DHCP Request packet specifically includes:

acquiring the IP address of the client from an Option 50 field or a ciaddr field of the DHCP Request packet.

In this step, the DHCP relay agent finds, in the multiple gateway IP addresses and according to the Option 50 field or the ciaddr field of the DHCP Request packet sent by the client, the gateway IP address that belongs to the same network segment as the DHCP client.

Step 103. The relay agent adds, to the DHCP Request packet, the gateway IP address that is in the multiple gateway IP addresses and belongs to the same network segment as the IP address of the client, and sends the DHCP Request packet with the gateway IP address to the DHCP server, so that the DHCP server allocates the IP address to the client.

Figure 2:
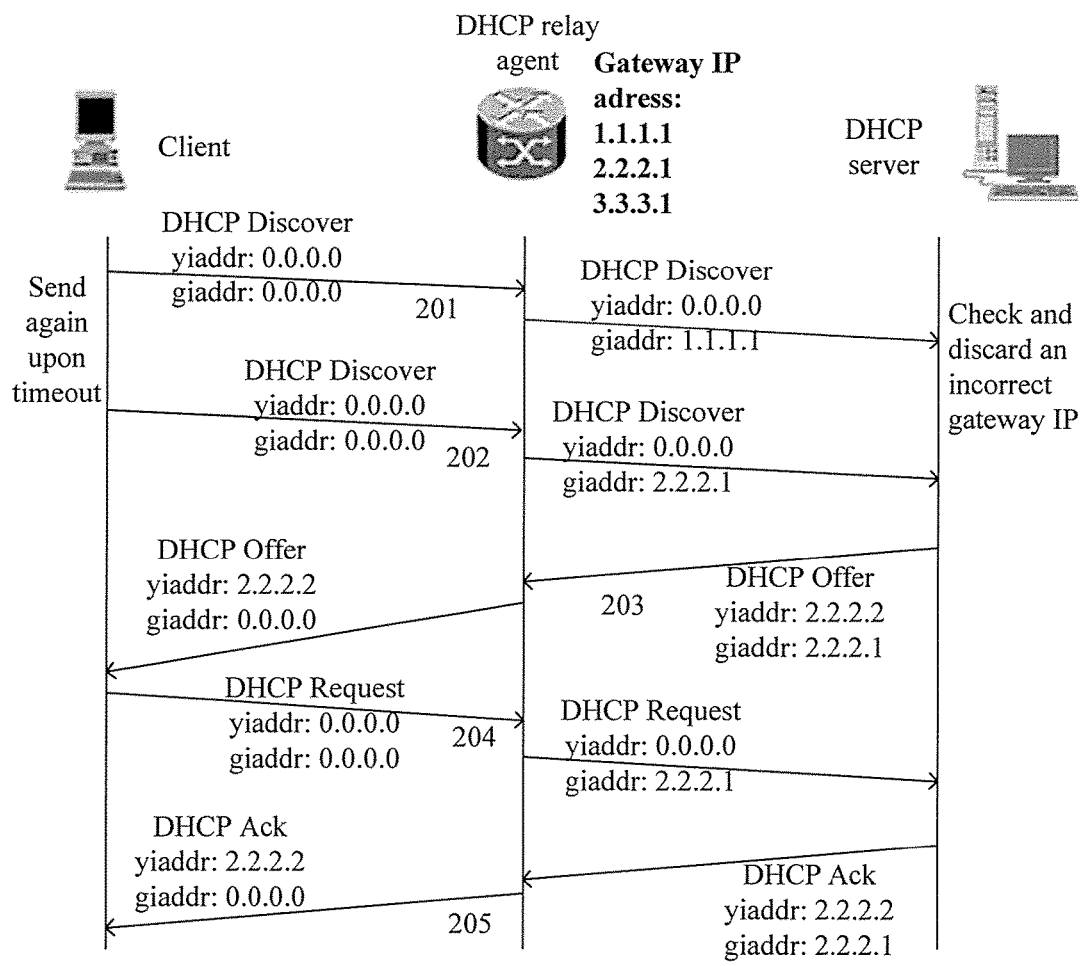
FIG. 2 is a schematic diagram of a method for acquiring an IP address in a network according to an embodiment of the present invention.

Specifically, referring to FIG. 2, FIG. 2 is a schematic diagram of a method for acquiring an IP address in a network according to this embodiment of the present invention. FIG. 2 includes the following steps:

Step 201. A DHCP client sends a DHCP Discover packet to a DHCP server; a DHCP relay agent receives the DHCP Discover packet, fills the first gateway IP address in multiple pre-allocated gateway IP addresses into a gateway IP address of the DHCP Discover packet, and sends the DHCP Discover packet filled with the gateway IP address to the DHCP server; the DHCP server pre-allocates an IP address in a correct IP network segment to the DHCP client according to a related characteristic in the DHCP Discover packet, and checks whether the pre-allocated IP address and the gateway IP address filled into the DHCP Discover packet belong to a same network segment.

Step 202. If the pre-allocated IP address and the gateway IP address filled into the DHCP Discover packet do not belong to the same network segment, the DHCP server considers the DHCP Discover packet invalid, releases the pre-allocated IP, and no longer sends a DHCP Offer packet to the DHCP client; after that, a state machine of the DHCP client expires, and a DHCP Discover packet is sent again; after receiving the second DHCP Discover packet sent by the DHCP client, the DHCP relay agent selects the second gateway IP address, fills the gateway IP address into a gateway IP address of the second DHCP Discover packet, and sends the second DHCP Discover packet filled with the gateway IP address to the DHCP server. By that analogy, a one-by-one test manner is used until a correct gateway IP address is selected for the DHCP Discover packet.

Step 203. If the pre-allocated IP address and the gateway IP address filled into the DHCP Discover packet belong to the same network segment, the DHCP server sends a DHCP Offer packet to the DHCP client.

Step 204. After receiving the DHCP Offer packet, the DHCP client sends a DHCP Request packet to the DHCP server; the DHCP relay agent finds, in the multiple gateway IP addresses and according to a related characteristic in the DHCP Request packet, a gateway IP address that belongs to a same network segment as the DHCP client, fills the gateway IP address into a gateway IP address of the DHCP Request packet, and sends the DHCP Request packet filled with the gateway IP address to the DHCP server.

Step 205. The DHCP server receives the DHCP Request packet filled with the gateway IP address, and responds to the DHCP client with a DHCP ACK packet, so that the DHCP client acquires the IP address in the correct IP network segment according to the DHCP ACK packet.

In an optional embodiment, the method further includes:

If the pre-allocated IP address and the gateway IP address filled into the DHCP Discover packet do not belong to the same network segment, confirming, by the DHCP server, that the DHCP Discover packet is invalid, releasing the pre-allocated IP address in the correct IP network segment, and skipping sending a DHCP Offer packet to the DHCP client.

After that, a state machine of the DHCP client expires, and a Discover packet is sent to the DHCP server again; when receiving the DHCP Discover packet sent by the DHCP client again, the DHCP relay agent selects a next gateway IP address in the multiple gateway IP addresses, fills the gateway IP address into a gateway IP address of the DHCP Discover packet sent again, and sends the DHCP Discover packet filled with the gateway IP address to the DHCP server; the DHCP server receives the DHCP Discover packet filled with the gateway IP address, pre-allocates an IP address in a correct IP network segment to the DHCP client according to a related characteristic of the DHCP Discover packet, and determines whether the pre-allocated IP address and the gateway IP address filled into the DHCP Discover packet belong to a same network segment.

Figure 3:
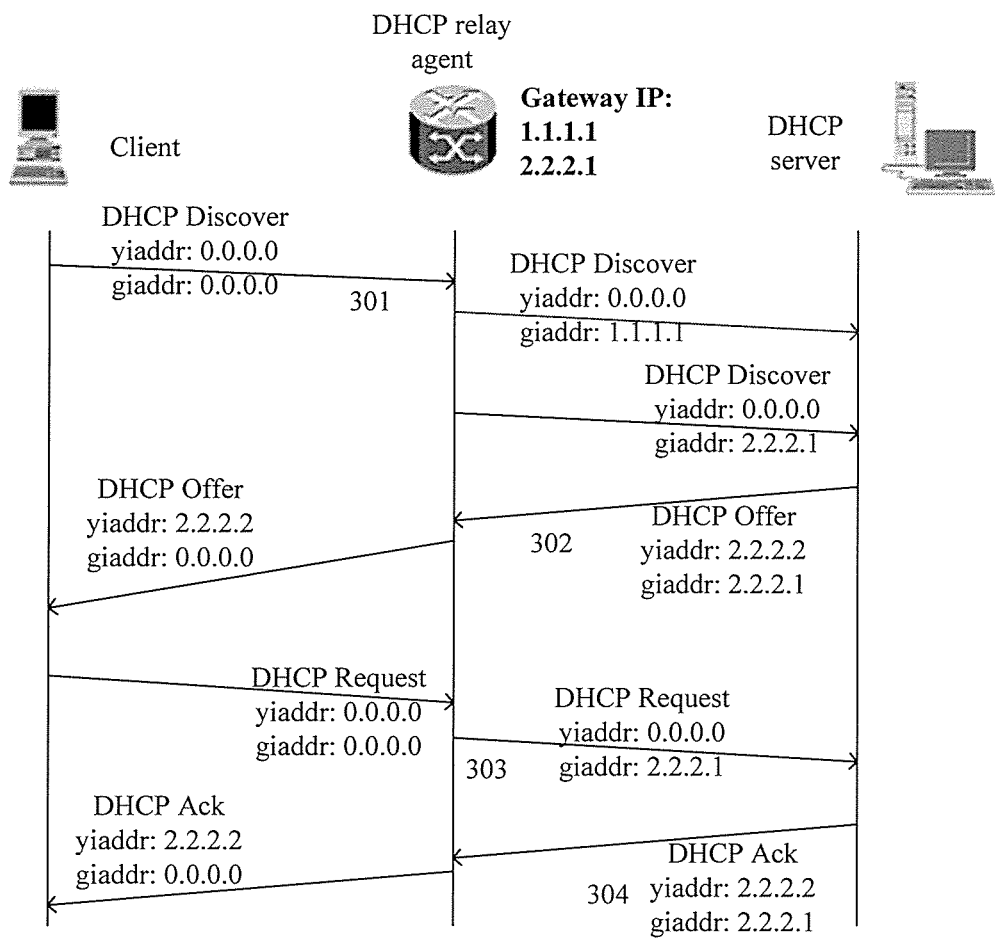
FIG. 3 is a schematic diagram of a method for acquiring an IP address in a network according to an embodiment of the present invention.

Specifically, referring to FIG. 3, FIG. 3 is a schematic diagram of a method for acquiring an IP address in a network according to this embodiment of the present invention. FIG. 3 includes the following steps:

Step 301. A DHCP client sends a DHCP Discover packet to a DHCP server; a DHCP relay agent receives the DHCP Discover packet, replicates the DHCP Discover packet to obtain multiple DHCP Discover packets, adds one gateway IP address in multiple gateway IP addresses to each DHCP Discover packet, and sends the multiple DHCP Discover packets carrying different gateway IP addresses to the DHCP server.

Step 302. The DHCP server receives the multiple DHCP Discover packets filled with gateway IP addresses, pre-allocates an IP address in a correct IP network segment to the DHCP client according to a related characteristic in the multiple DHCP Discover packets, determines whether the pre-allocated IP address and one of the gateway IP addresses filled into the multiple DHCP Discover packets belong to a same network segment, and responds, with a DHCP Offer packet, to a DHCP Discover packet filled with the gateway IP address that belongs to the same network segment.

In this step, after receiving the multiple DHCP Discover packets filled with the gateway IP addresses, the DHCP server pre-allocates the IP address in the correct IP network segment to the DHCP client according to OPTION60s or MAC addresses of the multiple DHCP Discover packets, determines whether the pre-allocated IP address and one of the gateway IP addresses filled into the multiple DHCP Discover packets belong to the same network segment, and responds, with the DHCP Offer packet, to the DHCP Discover packet that belongs to the same network segment.

The DHCP Offer packet is a response made by the DHCP server to the DHCP Discover packet.

Step 303. After receiving the DHCP Offer packet, the DHCP client sends a DHCP Request packet to the DHCP server; the DHCP relay agent finds, in the multiple gateway IP addresses and according to a related characteristic in the DHCP Request packet, a gateway IP address that belongs to a same network segment as the DHCP client, fills the gateway IP address into a gateway IP address of the DHCP Request packet, and sends the DHCP Request packet filled with the gateway IP address to the DHCP server.

The DHCP Request packet is a response made by the DHCP client to the DHCP Offer packet of the DHCP server when the DHCP client starts a DHCP procedure, or a packet sent by the DHCP client to extend an IP address lease time.

In this step, the DHCP relay agent finds, in the multiple gateway IP addresses and according to the IP address of the DHCP client in the DHCP Request packet, namely, an Option 50 field or a ciaddr field of the DHCP Request packet, the gateway IP address that belongs to the same network segment as the DHCP client, fills the gateway IP address into the gateway IP address of the DHCP Request packet, and sends the DHCP Request packet filled with the gateway IP address to the DHCP server.

Step 304. The DHCP server receives the DHCP Request packet filled with the gateway IP address, and responds to the DHCP client with a DHCP ACK packet, so that the DHCP client acquires the IP address in the correct IP network segment according to the DHCP ACK packet.

The DHCP ACK packet is an acknowledgement response packet made by the DHCP server to the DHCP Request packet of the DHCP client. After receiving this packet, the DHCP client generally starts a new DHCP procedure.

In this step, the DHCP server receives the DHCP Request packet filled with the gateway IP address, and responds to the DHCP client with the DHCP ACK packet, so that the DHCP client acquires the IP address in the correct IP network segment according to the DHCP ACK packet, thereby completing the procedure of acquiring the IP address by the DHCP client.

Figure 4:
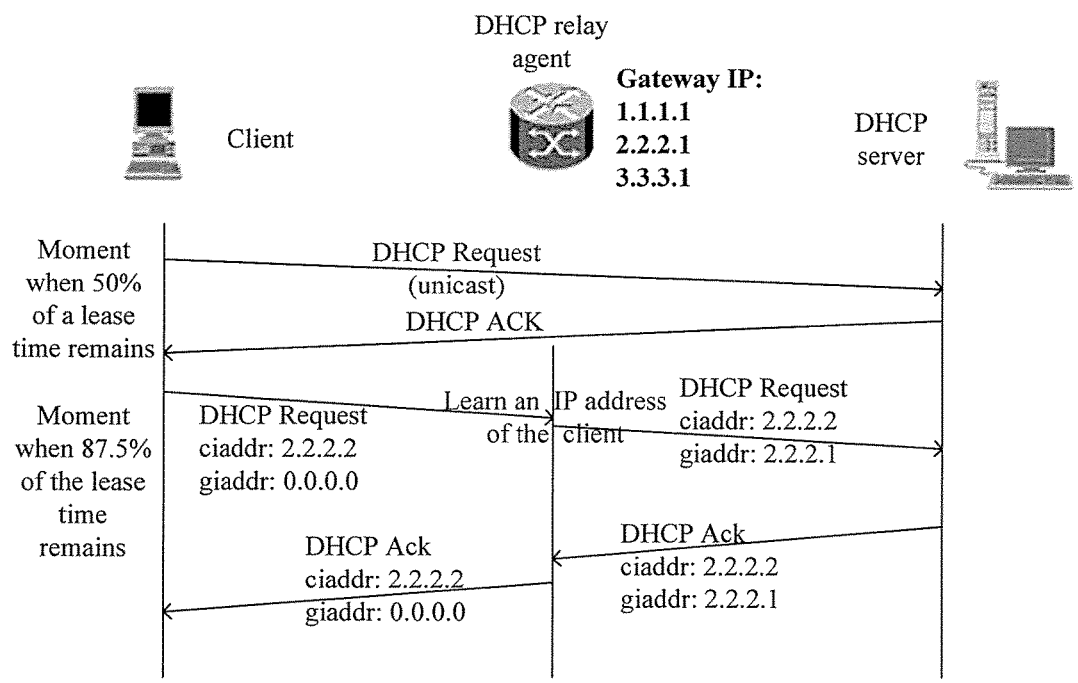
FIG. 4 is a schematic diagram of a method for acquiring an IP address in a network according to an embodiment of the present invention.

In another optional embodiment, referring to FIG. 4, FIG. 4 is a schematic diagram of a method for acquiring an IP address in a network according to this embodiment of the present invention.

After a DHCP client completes an IP address acquiring procedure, when 50% of a lease time remains, the DHCP client sends a unicast DHCP Request packet to a DHCP server; if the DHCP server responds to the DHCP Request packet, the DHCP server sends a DHCP ACK packet to the DHCP client, so as to confirm that the packet is valid and confirm that the DHCP client can continue to use a current allocated IP address.

When the unicast DHCP Request packet fails to be received and 87.5% of the lease time remains, the DHCP client sends a broadcast DHCP Request packet to the DHCP server; after receiving the broadcast DHCP Request packet, a DHCP relay agent fills, according to a ciaddr field of the DHCP Request packet, a correct gateway IP address into a gateway IP address of the DHCP Request packet. After receiving the DHCP Request packet filled with the gateway IP address, the DHCP server responds to the DHCP client with a DHCP ACK packet, and the DHCP client acquires a correct IP address according to the DHCP ACK packet, thereby completing the procedure of acquiring the IP address by the DHCP client.

This embodiment of the present invention provides a method for acquiring an IP address in a network. According to the method, a relay agent configures multiple gateway IP addresses corresponding to a type of a client; the relay agent adds the multiple gateway IP addresses to a DHCP Discover packet of the client, and sends the DHCP Discover packet to a DHCP server, so that the DHCP server allocates an IP address to the client, and sends a DHCP Offer packet to the client after determining that one gateway IP address in the multiple gateway IP addresses belongs to a same network segment as the allocated IP address; the relay agent adds, to a DHCP Request packet, the gateway IP address that is in the multiple gateway IP addresses and belongs to the same network segment as the IP address of the client, and sends the DHCP Request packet with the gateway IP address to the DHCP server, so that the DHCP server allocates the IP address to the client, thereby implementing that multiple IPs in different IP address segments are allocated to a same DHCP client type.

In this embodiment, for lease renewal of a DHCP client, a DHCP relay agent is not required for unicast renewal; for a broadcast renewal packet, the DHCP client learns a ciaddr field of a DHCP Request packet, and fills a correct gateway IP address. In this way, by using the method for acquiring an IP address in a network, the DHCP client can acquire a correct IP address no matter during a normal IP address acquiring procedure or a lease renewal procedure.

Embodiment 2

Figure 5:
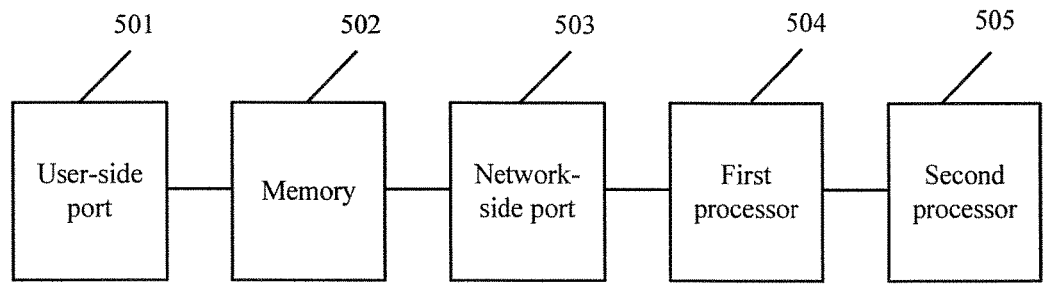
FIG. 5 is an apparatus structural diagram of a relay agent according to Embodiment 2 of the present invention.
Figure 6:
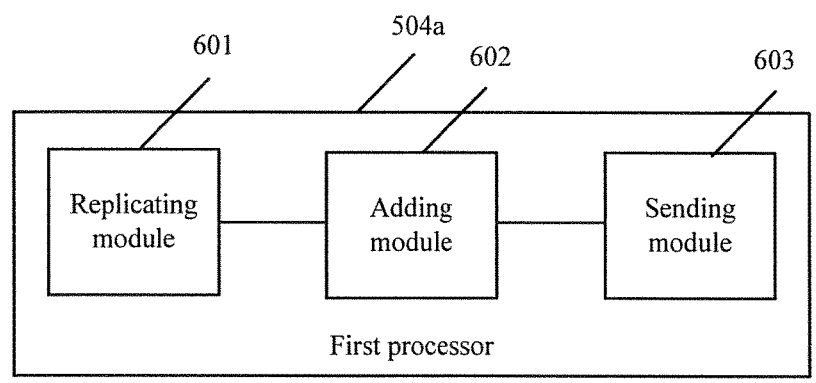
FIG. 6 is an apparatus structural diagram of a first processor in a relay agent according to Embodiment 2 of the present invention.
Figure 7:
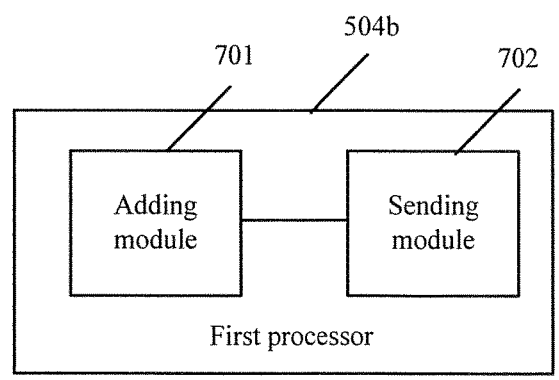
FIG. 7 is an apparatus structural diagram of a first processor in a relay agent according to Embodiment 2 of the present invention.

Referring to FIG. 5, FIG. 5 is an apparatus structural diagram of a relay agent according to Embodiment 2 of the present invention. As shown in FIG. 5, the apparatus includes the following devices:

a user-side port 501, configured to connect to a client, and configured to receive a Dynamic Host Configuration Protocol DHCP Discover packet of the client;

a memory 502, configured to store multiple gateway IP addresses corresponding to a type of the client;

a network-side port 503, configured to connect to a DHCP server; and a first processor 504, configured to add the multiple gateway IP addresses to the DHCP Discover packet of the client, and send the DHCP Discover packet to the DHCP server by using the network-side port, so that the DHCP server allocates an IP address to the client, and sends a DHCP Offer packet to the client after determining that one gateway IP address in the multiple gateway IP addresses belongs to a same network segment as the allocated IP address.

Realizably, one example 504a of the first processor 504 specifically includes:

a replicating module 601, configured to replicate the DHCP Discover packet to obtain multiple DHCP Discover packets;

an adding module 602, configured to add one gateway IP address in the multiple gateway IP addresses to each DHCP Discover packet; and a sending module 603, configured to send the multiple DHCP Discover packets carrying different gateway IP addresses to the DHCP server by using the network-side port.

Realizably, another example 504b of the first processor 504 specifically includes:

an adding module 701, configured to add the multiple gateway IP addresses to multiple DHCP Discover packets received by the user-side port, where one gateway IP address is added to each DHCP discover packet;

a sending module 702, configured to send the multiple DHCP Discover packets with the gateway IP addresses to the DHCP server; and a second processor 505, configured to: after a DHCP Request packet from the client is received by the user-side port, acquire an IP address of the client from the DHCP Request packet, select, from the multiple gateway IP addresses, one gateway IP address that belongs to the same network segment as the IP address of the client, add the selected gateway IP address to the DHCP Request packet, and send the DHCP Request packet to the DHCP server, so that the DHCP server allocates the IP address to the client.

Realizably, the second processor specifically acquires the IP address of the client from an Option 50 field or a ciaddr field of the DHCP Request packet.

The relay agent is a digital subscriber line access multiplexer DSLAM, an optical line terminal OLT, or a multiservice access node MSAN.

This embodiment of the present invention provides a relay agent. The relay agent configures multiple gateway IP addresses corresponding to a type of a client; the relay agent adds the multiple gateway IP addresses to a DHCP Discover packet of the client, and sends the DHCP Discover packet to a DHCP server, so that the DHCP server allocates an IP address to the client, and sends a DHCP Offer packet to the client after determining that one gateway IP address in the multiple gateway IP addresses belongs to a same network segment as the allocated IP address; the relay agent adds, to a DHCP Request packet, the gateway IP address that is in the multiple gateway IP addresses and belongs to the same network segment as the IP address of the client, and sends the DHCP Request packet with the gateway IP address to the DHCP server, so that the DHCP server allocates the IP address to the client, thereby implementing that multiple IPs in different IP address segments are allocated to a same DHCP client type.

Embodiment 3

Figure 8:
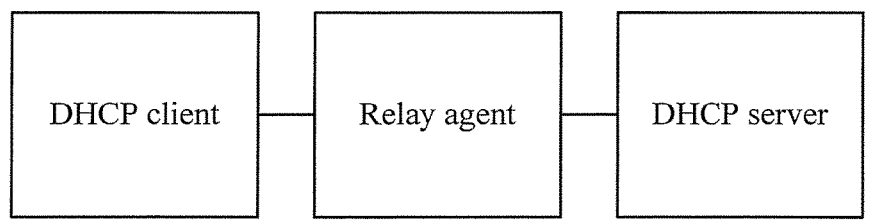
FIG. 8 is a structural diagram of a system for acquiring an Internet Protocol IP according to Embodiment 3 of the present invention.

Referring to FIG. 8, FIG. 8 is a structural diagram of a system for acquiring an Internet Protocol IP according to Embodiment 3 of the present invention. As shown in FIG. 8, the system includes the following apparatuses:

a client, a relay agent, and a Dynamic Host Configuration Protocol DHCP server, where the client is connected to the DHCP server via the relay agent.

The relay agent, configured with multiple gateway IP addresses corresponding to a type of the client, adds the multiple gateway IP addresses to a DHCP Discover packet of the client, and sends the DHCP Discover packet to the DHCP server; receives a DHCP Request packet from the client, acquires an IP address of the client from the DHCP Request packet, selects, from the multiple gateway IP addresses, one gateway IP address that belongs to a same network segment as the IP address of the client, adds the selected gateway IP address to the DHCP Request packet, and sends the DHCP Request packet to the DHCP server, so that the DHCP server allocates the IP address to the client.

Realizably, that the relay agent adds the multiple gateway IP addresses to a DHCP Discover packet of the client, and sends the DHCP Discover packet to the DHCP server specifically includes:

receiving the DHCP Discover packet from the client, replicating the DHCP Discover packet to obtain multiple DHCP Discover packets, adding one gateway IP address in the multiple gateway IP addresses to each DHCP Discover packet, and sending, to the DHCP server, the multiple DHCP Discover packets carrying different gateway IP addresses.

Realizably, that the relay agent adds the multiple gateway IP addresses to a DHCP Discover packet of the client, and sends the DHCP Discover packet to the DHCP server specifically includes:

receiving multiple DHCP Discover packets of the client, sequentially adding the multiple gateway IP addresses to the multiple DHCP Discover packets, and sending the multiple DHCP Discover packets to the DHCP server, where each DHCP Discover packet carries one different gateway IP address.

The DHCP server is configured to: after receiving the DHCP Discover packet, allocate the IP address to the client, and send a DHCP Offer packet to the client after determining that one gateway IP address in the multiple gateway IP addresses belongs to the same network segment as the allocated IP address.

In an optional embodiment, the relay agent is further configured to: after receiving the DHCP Discover packet of the client, acquire the type of the client, and acquire the multiple corresponding gateway IP addresses according to the type of the client.

This embodiment of the present invention provides a system. The system configures multiple gateway IP addresses corresponding to a type of a client by using a relay agent; the relay agent adds the multiple gateway IP addresses to a DHCP Discover packet of the client, and sends the DHCP Discover packet to a DHCP server, so that the DHCP server allocates an IP address to the client, and sends a DHCP Offer packet to the client after determining that one gateway IP address in the multiple gateway IP addresses belongs to a same network segment as the allocated IP address; the relay agent adds, to a DHCP Request packet, the gateway IP address that is in the multiple gateway IP addresses and belongs to the same network segment as the IP address of the client, and sends the DHCP Request packet with the gateway IP address to the DHCP server, so that the DHCP server allocates the IP address to the client, thereby implementing that multiple IPs in different IP address segments are allocated to a same DHCP client type.

Embodiment 4

Figure 9:
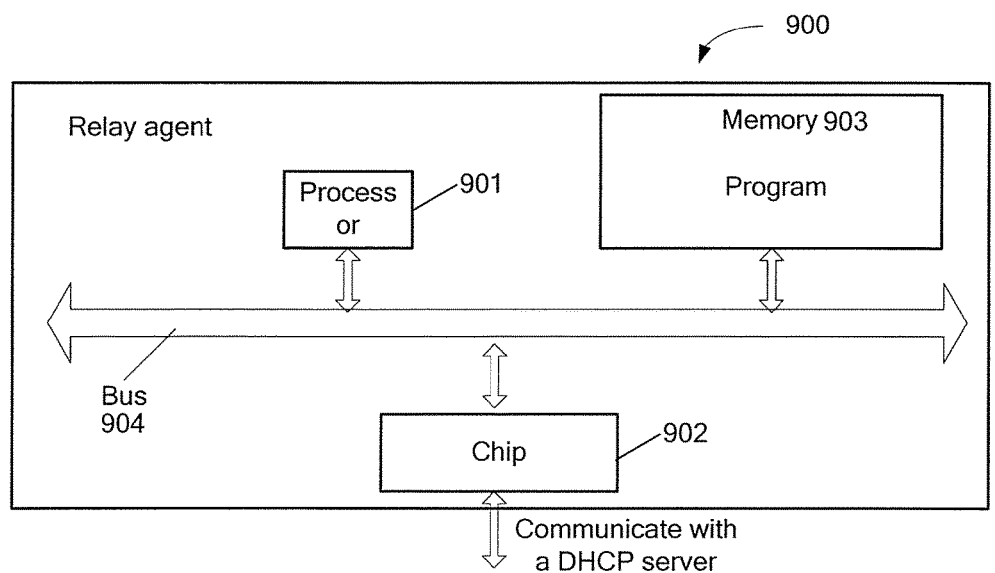
FIG. 9 is an apparatus structural diagram of a relay agent according to Embodiment 4 of the present invention.

Referring to FIG. 9, FIG. 9 is an apparatus structural diagram of a relay agent according to Embodiment 4 of the present invention. Referring to FIG. 9, FIG. 9 shows a relay agent 900 according to this embodiment of the present invention. A specific embodiment of the present invention does not limit a specific implementation of the communications device. The relay agent 900 includes:

a processor (processor) 901, a chip 902, a memory (memory) 903, and a bus 904, where the processor 901, the chip 902, and the memory 903 complete communication with each other by using the bus 904;

the chip 902 is configured to communicate with a DHCP server; and the processor 901 is configured to execute a program.

Specifically, the program may include program code, where the program code includes a computer operation instruction.

The processor 901 may be one or more central processing units CPU, or an application-specific integrated circuit ASIC (Application Specific Integrated Circuit), or one or more integrated circuits configured to implement the embodiments of the present invention.

The memory 903 is configured to store the program. The memory 903 may include a high-speed random access memory (random access memory, RAM for short), or may further include a non-volatile memory (non-volatile memory).

When the relay agent is running, the processor 901 is configured to execute the program.

The relay agent adds multiple gateway IP addresses to a DHCP Discover packet of a client, and sends the DHCP Discover packet to a DHCP server, so that the DHCP server allocates an IP address to the client, and sends a DHCP Offer packet to the client after determining that one gateway IP address in the multiple gateway IP addresses belongs to a same network segment as the allocated IP address;

the relay agent receives a DHCP Request packet from the client, and acquires the IP address of the client from the DHCP Request packet; and the relay agent adds, to the DHCP Request packet, the gateway IP address that is in the multiple gateway IP addresses and belongs to the same network segment as the IP address of the client, and sends the DHCP Request packet with the gateway IP address to the DHCP server, so that the DHCP server allocates the IP address to the client.

A person of ordinary skill in the art may understand that all or some of the processes of the methods in the embodiments of the present invention may be implemented by a computer program instructing relevant hardware. The program may be stored in a computer readable storage medium. When the program runs, the processes of the methods in the embodiments are performed. The storage medium may include: a magnetic disk, an optical disc, a read-only memory (Read-Only Memory, ROM), or a random access memory (Random Access Memory, RAM).

The foregoing descriptions are merely exemplary embodiments of the present invention, but are not intended to limit the protection scope of the present invention. Any equivalent modifications made according to the claims of the present invention still fall within the scope of the present invention.

What is claimed is:

1. A method for acquiring an Internet Protocol (IP) address in a network, the method comprising:
receiving a Dynamic Host Configuration Protocol(DHCP) Discover packet from a client, by a relay agent, replicating the DHCP Discover packet to obtain multiple DHCP Discover packets, adding one gateway IP address of multiple gateway IP addresses to each DHCP Discover packet, and after replicating the DHCP Discover packet to obtain the multiple DHCP Discover packets and adding one gateway IP address of the multiple gateway IP addresses to each DHCP Discover packet, then sending the multiple DHCP Discover packets carrying different gateway IP addresses to a DHCP server for instructing the DHCP server to allocate an IP address to the client and to send a DHCP Offer packet to the client after determining that one gateway IP address in the multiple gateway IP addresses belongs to a same network segment as the allocated IP address;
receiving, by the relay agent, a DHCP Request packet from the client, and acquiring an IP address of the client from the DHCP Request packet; and
adding, by the relay agent to the DHCP Request packet, the gateway IP address that is in the multiple gateway IP addresses and belongs to the same network segment as the IP address of the client, and sending the DHCP Request packet with the gateway IP address to the DHCP server.

2. The method according to claim 1, wherein before adding one gateway IP address of the multiple gateway IP addresses to each DHCP Discover packet, and sending the multiple DHCP Discover packets to the DHCP server, the method further comprises:
acquiring the type of the client, and acquiring the multiple gateway IP addresses corresponding to the type of the client according to the type of the client.

3. The method according to claim 1, wherein acquiring the IP address of the client from the DHCP Request packet comprises:
acquiring the IP address of the client from an Option 50 field or a ciaddr field of the DHCP Request packet.

4. A relay agent for acquiring an Internet Protocol (IP) address, the relay agent comprising:
a memory storage comprising instructions; and
one or more processors in communication with the memory, wherein the one or more processors execute the instructions to:
replicate a Dynamic Host Configuration Protocol (DHCP) Discover packet of a client to obtain multiple DHCP Discover packets;
add one gateway IP address of multiple gateway IP addresses to each DHCP Discover packet;
after the processor executes the instructions to replicate the DHCP Discover packet to obtain the multiple DHCP Discover packets and add one gateway IP address of the multiple gateway IP addresses to each DHCP Discover packet, then send the multiple DHCP Discover packets carrying different gateway IP addresses to the DHCP server by using a network-side port;
instruct the DHCP server to allocate an IP address to the client and send a DHCP Offer packet to the client after determining that one gateway IP address in the multiple gateway IP addresses belongs to a same network segment as the allocated IP address; and
after a DHCP Request packet from the client is received, acquire an IP address of the client from the DHCP Request packet, select, from the multiple gateway IP addresses, one gateway IP address that belongs to the same network segment as the IP address of the client, add the selected gateway IP address to the DHCP Request packet, and send the DHCP Request packet to the DHCP server.

5. The relay agent according to claim 4, wherein the one or more processors execute the instructions to:
acquire the IP address of the client from an Option 50 field or a ciaddr field of the DHCP Request packet.

6. The relay agent according to claim 4, wherein the relay agent is a digital subscriber line access multiplexer (DSLAM), an optical line terminal (OLT), or a multiservice access node (MSAN).

7. A relay agent comprising:
a memory having first instructions stored thereon and one or more first processors in communication with the memory, wherein the one or more first processors are configured to execute the first instructions to:
receive a Dynamic Host Configuration Protocol (DHCP) Discover packet from a client;
replicate the DHCP Discover packet to obtain multiple DHCP Discover packets;
add one gateway IP address of multiple gateway IP addresses to each of the multiple DHCP Discover packets, and after the one or more first processors execute the instructions to replicate the DHCP Discover packet to obtain the multiple DHCP Discover packets and add one gateway IP address of the multiple gateway IP addresses to each DHCP Discover packet, then send the multiple DHCP Discover packets carrying different gateway IP addresses to the DHCP server; and
receive a DHCP Request packet from the client, acquire an IP address of the client from the DHCP Request packet, select, from the multiple gateway IP addresses, one gateway IP address that belongs to a same network segment as the IP address of the client, add the selected gateway IP address to the DHCP Request packet, and send the DHCP Request packet to the DHCP server, so that the DHCP server instructs the DHCP server to allocate the IP address to the client.

8. The system according to claim 7, wherein the one or more first processors are configured to execute the first instructions to:
receive the DHCP Discover packet of the client, acquire the type of the client, and acquire the multiple gateway IP addresses corresponding to the type of the client according to the type of the client.

9. The system according to claim 7, wherein the relay agent is a digital subscriber line access multiplexer (DSLAM), or an optical line terminal (OLT), or a multiservice access node (MSAN).

* * * * *